United States Patent [19]

Nakajima et al.

[11] Patent Number: 4,477,807
[45] Date of Patent: Oct. 16, 1984

[54] RADIO PAGER WITH DISPLAY DEVICE

[75] Inventors: Takeshi Nakajima; Takashi Ohyagi, both of Tokyo, Japan

[73] Assignee: Nippon Electric Co., Ltd., Tokyo, Japan

[21] Appl. No.: 385,140

[22] Filed: Jun. 4, 1982

[30] Foreign Application Priority Data

Jun. 10, 1981 [JP] Japan .................................. 56-89789

[51] Int. Cl.³ .............................................. G08B 5/22
[52] U.S. Cl. ........................... 340/825.44; 340/825.48; 455/38
[58] Field of Search ...................... 340/825.44, 825.48, 340/825.47, 311.1; 179/2 EC; 455/31, 32, 38

[56] References Cited

U.S. PATENT DOCUMENTS

| 4,197,526 | 4/1980 | Levine | 340/825.44 |
| 4,249,165 | 2/1981 | Mori | 340/825.44 |
| 4,336,524 | 6/1982 | Levine | 340/311.1 |
| 4,385,295 | 5/1983 | Willard | 340/825.44 |
| 4,412,217 | 10/1983 | Willard | 340/825.44 |
| 4,438,433 | 3/1984 | Smoot | 340/825.44 |

Primary Examiner—James J. Groody
Attorney, Agent, or Firm—Sughrue, Mion, Zinn, Macpeak & Seas

[57] ABSTRACT

A radio pager receives a signal having a selective calling signal portion and message signal portion and examines the selective calling portion of the signal for its own ID code. Upon detecting a match, an alert signal is provided and the message signal portion is stored in a memory if it does not match any of the message signals already stored. A counter also keeps track of the number of stored messages. The messages can be sequentially displayed when desired.

12 Claims, 37 Drawing Figures

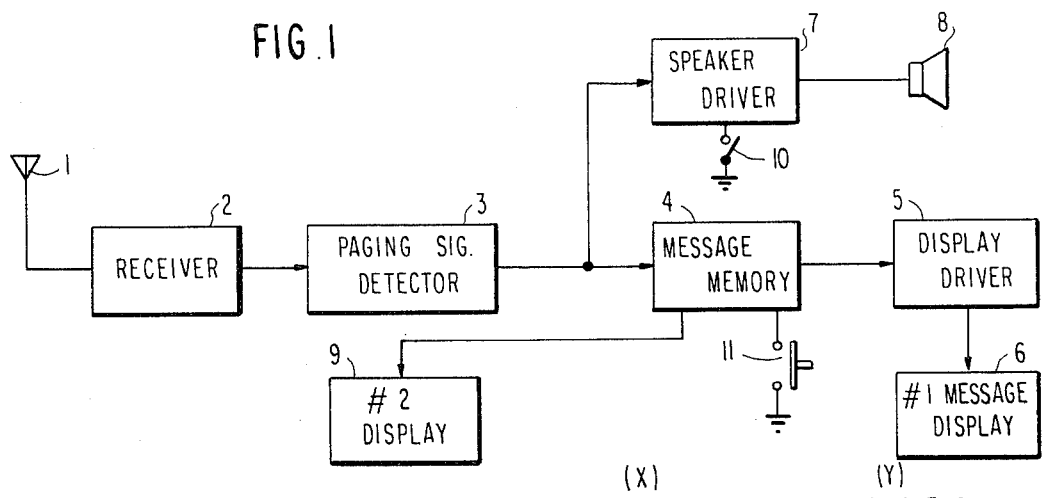
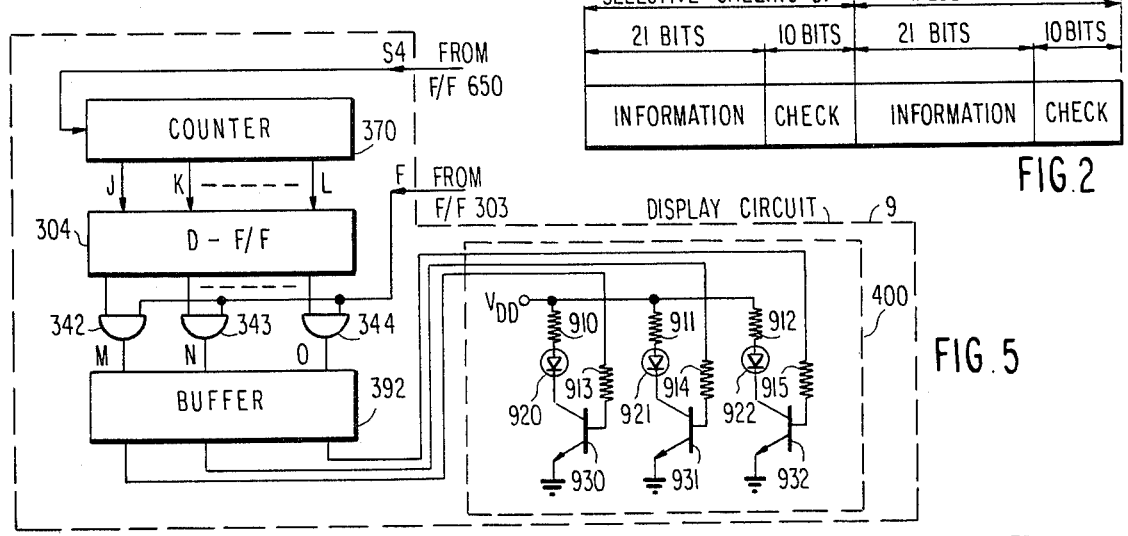
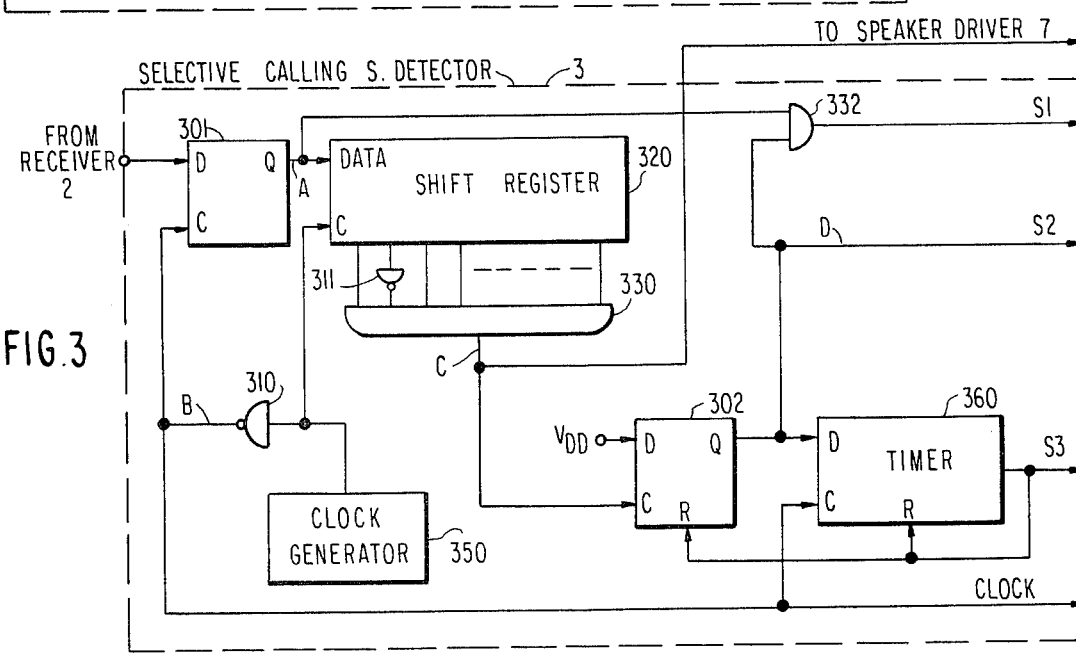

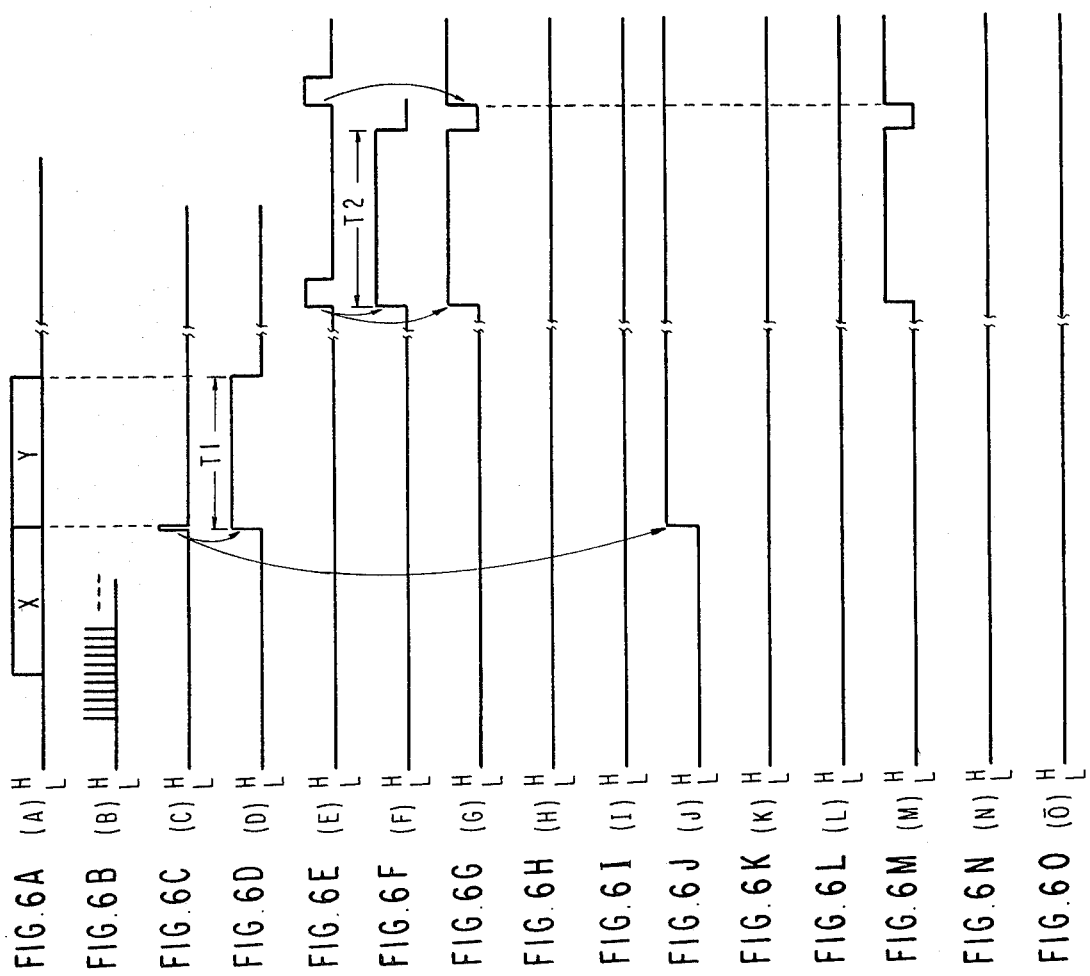

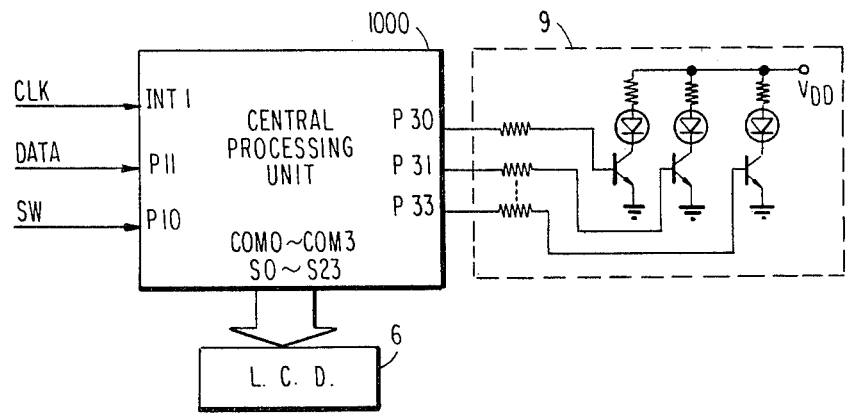
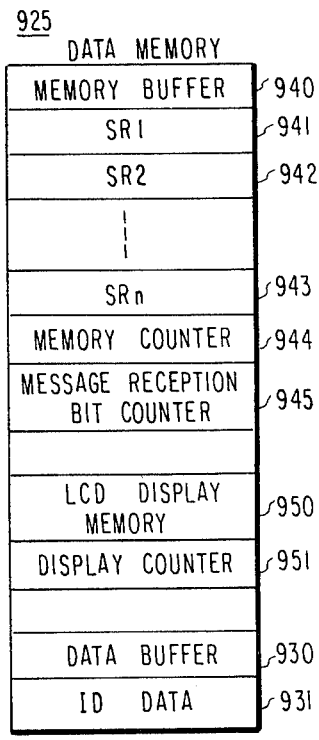
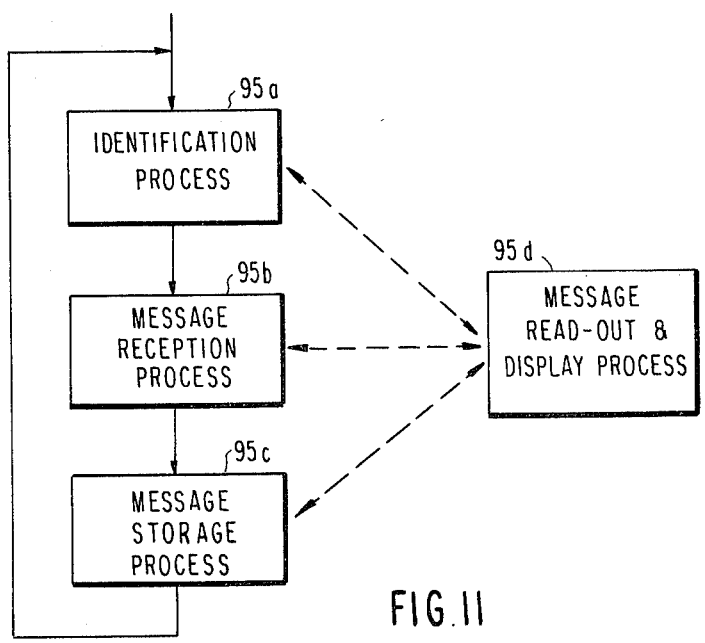

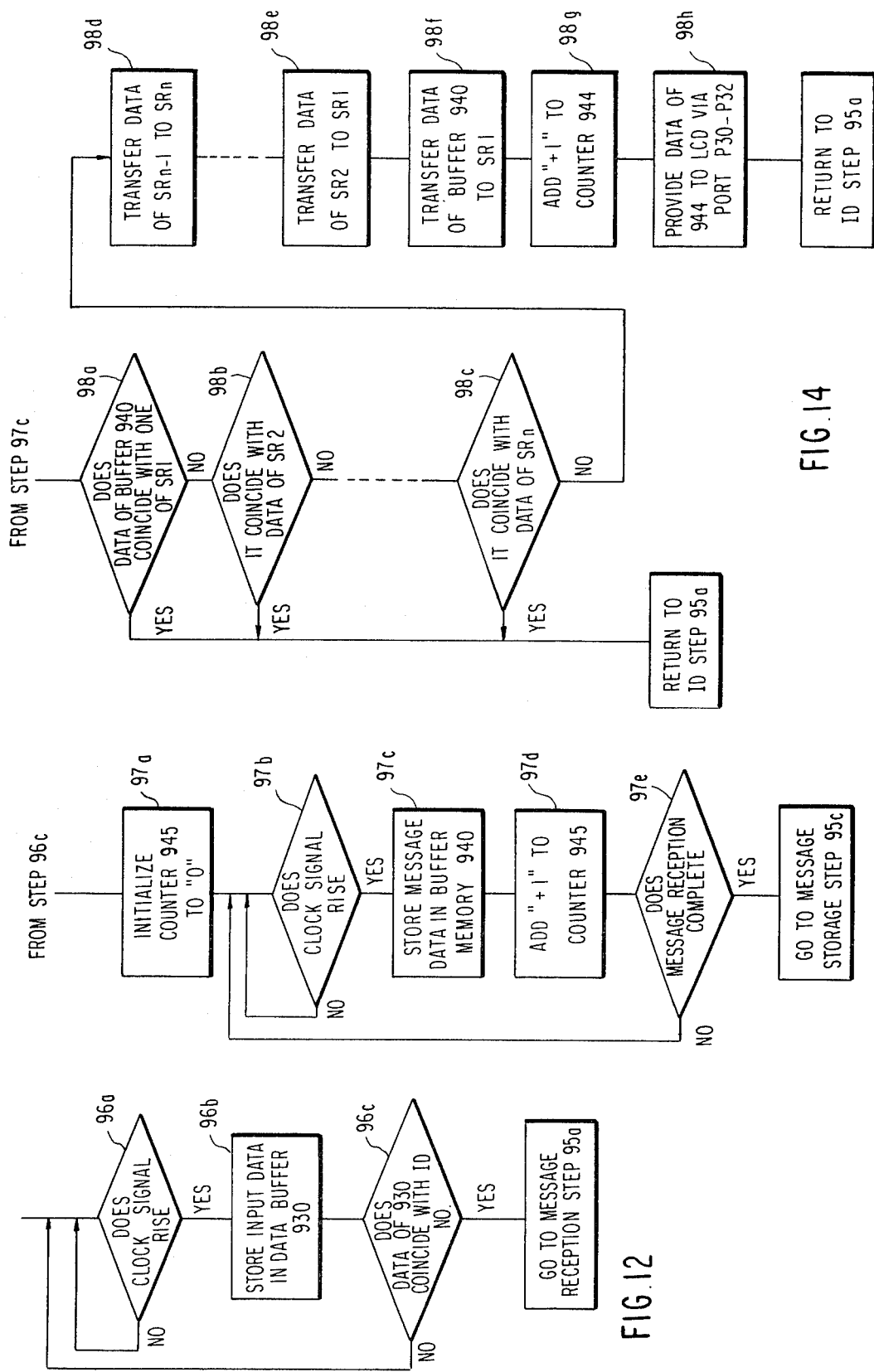

RADIO PAGER WITH DISPLAY DEVICE

BACKGROUND OF INVENTION

The present invention relates to a radio pager and, more particularly, to a radio pager capable of selectively displaying one of a plurality of message signals.

With the striking progress in the art of integrated circuits, a radio pager now under development is furnished with various functions other than the simple selection of selective calling (or paging) signals. A known type of such a pager receives, stores and displays a message signal following a selective calling signal. This type of pager is disclosed in U.S. Pat. No. 4,249,165 entitled "Digital Radio Pager," granted to Y. Mori and assigned to the present assignee.

While the Mori radio pager has a memory (or shift register) for storing a single message, the use of additional shift registers will permit the storage of a plurality of messages. In this case, regardless of whether or not the received messages are identical, they will be sequentially stored in the shift registers in the order of reception and, when the entire storage is filled up, erased sequentially from the oldest one. Generally, a system using such a radio pager repeatedly transmits a call including a selective calling signal and a message signal from a transmitting base station to the radio pager in order to increase the probability of reception at the radio pager, which is known as the so-called "repeat call". Upon a repeat call, the radio pager using the shift registers stores the same message repeatedly in its storage while successively erasing useful messages already stored therein, resulting in inconvenience.

Two different methods are available for reading out and confirming stored messages: one in which the pager itself reads the messages automatically without interruption out of a plurality of corresponding storage areas in response to a single actuation of a readout switch and displays the messages on a display unit, and the other in which a readout switch is actuated once for the reading-out of each message, that is, "n" times in total ("n" indicates the number of stored messages).

Though simple in operation, the former needs a long period of time for readout operation with an increase in the number of messages "n". This is not only a waste of time but contradictory to the general demand for lower power consumption. The latter facilitates recognition of the stored data within a shorter period of time than the former even if the number "n" is relatively large, though depending on the person's perception. However, since the number of stored messages is unknown, there is the risk of person's overlooking one full round of the messages unless they are counted up, or of failing to determine which one of the messages is the latest. The confusion will be particularly troublesome when the same message has been stored repeatedly.

SUMMARY OF THE INVENTION

It is therefore an object of the present invention to provide a radio pager which can make effective use of its storage without erasing previously stored useful messages even when a series of identical messages are received.

Another object of the present invention is to provide a radio pager which can read out and display a plurality of stored messages always beginning with the latest one.

Still another object of the present invention is to provide a radio pager which can display the number of a plurality of stored messages.

In accordance with the present invention, there is provided a radio pager comprising receiving means for receiving and demodulating a carrier wave modulated with a selective calling signal and a message signal to provide demodulated selective calling and message signals; means for detecting from the demodulated selective calling signal a selective calling signal assigned to the radio pager to provide a detected signal; means responsive to the detected signal for delivering an alert signal; first memory means for storing the demodulated message signal; a plurality of second memory means for respectively storing a plurality of message signals from the first memory means; first display means for displaying the message signal stored in the second memory means; and comparing means for comparing the message signal stored in the first memory means with the message signal stored in the second memory means and transferring the message signal from the first memory means to one of the plurality of second memory means when the compared message signals are different from each other.

BRIEF DESCRIPTION OF DRAWINGS

Other objects, features and advantages of the present invention will become more apparent from the following description in conjunction with the accompanying drawings, in which:

FIG. 1 is a schematic block diagram of a radio pager embodying the present invention;

FIG. 2 is a view of an exemplary signal format applicable to a system which uses the radio pager shown in FIG. 1;

FIG. 3 is a more specific block diagram of the selective calling signal detector 3 shown in FIG. 1;

FIG. 5 is a more specific block diagram of the circuit 9 shown in FIG. 1;

FIGS. 6A to 6O and 7A to 7I are timing charts demonstrating operations of the circuits shown in FIGS. 3 through 5;

FIG. 8 is a block diagram showing another embodiment of the present invention which employs a microprocessor;

FIG. 10 is a detailed view of the data memory 925 shown in FIG. 9;

FIG. 11 is a flowchart schematically indicating an operation of the embodiment shown in FIG. 8; and FIGS. 12 through 15 are flowcharts representing details of various portions of the procedure shown in FIG. 11.

DETAILED DESCRIPTION OF THE PREFERRED EMBODIMENT

Figure 4:
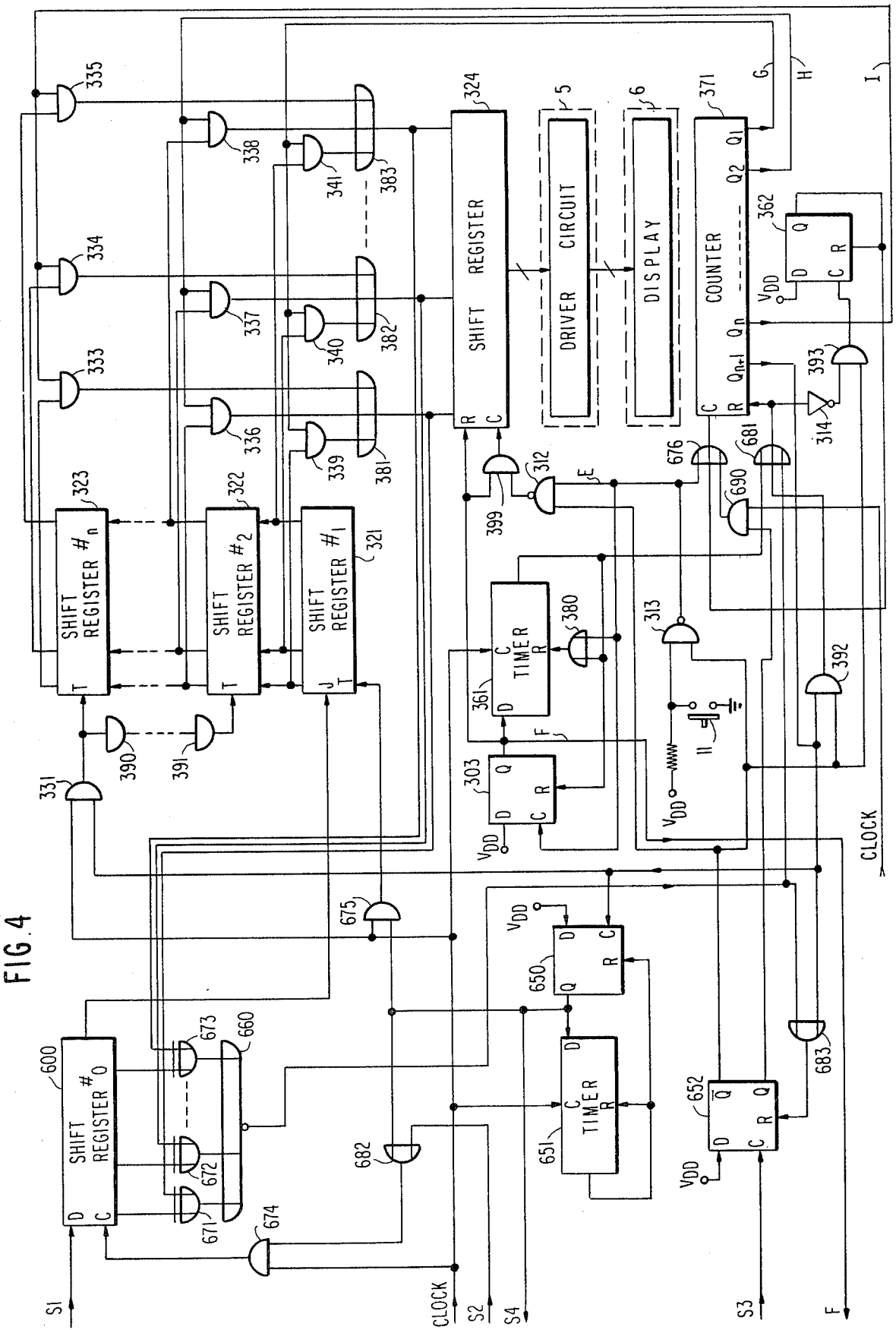
FIG. 4 is a block diagram of a message memory in the radio pager of FIG. 1.

Referring to FIG. 1, an antenna 1 picks up a carrier wave modulated by a selective calling signal and a message signal and supplies it to a receiver section 2 which demodulates it to provide a demodulated calling signal. The demodulated calling signal is supplied to a paging signal detector 3 which then compares the number corresponding to the calling signal with the number assigned to the pager. If they are identical and if a switch 10 is closed, the detector 3 activates a speaker driver 7 to energize a speaker 8. The sound of the speaker 8 informs the pager holder that he is being paged. Meanwhile the paging signal detector 3 operates to allow subsequent message signals to be stored in a message memory 4. The message memory 4 not only stores the received message signals but, as will be described hereinafter in detail, the message memory 4 also compares stored messages with the incoming message and excludes identical ones from the storage. When a readout switch 11 is depressed, a display driver 5 is energized to display the stored messages on a first display or message display 6 while, at the same time, a number of stored messages is indicated on a second display or message number display 9.

The aforementioned calling signal, as shown in FIG. 2, includes portions X and Y. Portion X is the selective calling signal or paging address for the pager identification which may comprise BCH (31, 21) code, which is one kind of cyclic code. Portion Y is the message signal which is in the same form of BCH (31, 21) code as the selective calling signal.

Referring to FIGS. 3 and 6A to 6O, the demodulated calling signal from the receiver section 2 (FIG. 1) is supplied to a D-type flip-flop 301 which is also supplied with a clock signal (FIG. 6B) from a clock generator 350. The calling signal thus synchronized with the clock signal is supplied to a shift register 320. Cooperating with an inverter 311 and the like, the shift register 320 produces a coincidence output (FIG. 6C) at an AND gate 330 when the input data coincides with a predetermined data pattern which corresponds to the number assigned to the pager. This shift register output energizes the speaker driver 7 (FIG. 1) and, at the same time, inverts D-type flip-flop 302. The resultant output (FIG. 6D) of the flip-flop 302 drives a timer 360 adapted to provide a period of time $T_1$ which is necessary for storing a message signal into the message memory 4. Upon the low- to high-level inversion of the flip-flop 302, an AND gate 332 is opened to store the message signal from the flip-flop 301 in the message memory 4.

As will be seen from the drawing and the operation described above, a signal $S_2$ from the Q terminal of the flip-flop 302 becomes high level in response to a coincidence output of the AND gate 330 and stays at the high level until the operating time of the timer 360 expires. A signal $S_1$ is the message signal which is continuously supplied to the message memory 4 while the gate signal $S_2$ remains at a high level. A signal $S_3$ indicates an expiration of operation of the timer 360 and, therefore, a completion of message signal reception. These signals $S_1$ to $S_3$ and the clock signal are supplied to the message memory 4 which is illustrated in detail in FIG. 4.

Referring to FIG. 4, when the gate signal $S_2$ becomes a high level to open an AND gate 674, the message signal $S_1$ is stored in a shift register 600. The message signal stored in the shift register 600 is compared with message signals stored in a series of first through nth shift registers 321 to 323 (n is a positive integer and equal to or larger than 2) which are composed of J/K-type flip-flops, respectively. The compared message signal is then transferred to fhe shift register 321 only when it is different from the message signals stored in registers #1 to #n. This comparison operation will be described in more detail.

The comparison operation starts in response to the message reception completion signal $S_3$. A D-type flip-flop 652 receives the signal $S_3$ at its clock terminal C to produce a high level output at its Q terminal and a low level output at its $\overline{Q}$ terminal. The $\overline{Q}$ terminal output activates the Q terminal output of a D-type flip-flop 303 by clocking that flip-flop through a NAND gate 313, and resets a timer 361 through the NAND gate 313 and an OR gate 380 to thereby start the timer 361. The Q output of the flip-flop 652, on the other hand, opens an AND gate 690 to supply the clock signals to a counter 371 through an OR gate 676. The counter 371 outputs a high level signal at any one of its terminals $Q_1$ through $Q_n$ while counting up the input clock signals. When the high level signal appears at the $Q_i$ ($i=1 \sim n$) terminal, the signals stored in the shift register #i are provided to OR gates 381 to 383 via AND gates 333 to 335, 336 to 338 or 339 to 341, respectively. Thus, the message signals stored in the shift registers 321 to 323 are sequentially read out to appear at the outputs of the OR gates 381 to 383 in timed relation with the clock signal.

The message signals at the OR gates 381 to 383 are respectively supplied to exclusive OR (EX-OR) gates 671 to 673 each of which receives the latest message signal from the memory buffer shift register 600. As a result, the message signals from the shift registers 321 to 323 are sequentially compared with the latest message signal from the shift register 600 by the respective EX-OR gates 671 to 673. The outputs of the EX-OR gates 671 to 673 are individually fed to a NOR gate 660.

When the NOR gate 660 produces a high level output indicating coincidence of the latest message signal with any one of the old message signals, the flip flop 652 and the counter 371 are forcibly reset through OR gates 683 and 681, respectively. Under this condition, the latest message signal is prevented from being transferred to the shift register 321. When the output level of the NOR gate 660 is low indicating non-coincidence, the counter 371 outputs a high level signal at its $Q_{n+1}$ terminal in response to which a D-type flip-flop 650 produces a high level signal at its Q terminal thereby triggering a timer 651. Thereupon, the clock signal is delivered to the shift register 321 via an AND gate 675 and to the shift register 600 via a NAND gate 682 and an AND gate 674. The output at the $Q_{n+1}$ terminal also opens a gate 331 to supply the shift registers 322 to 323 with the clock signal via AND gates 390 and 391, whereby the message signal in each shift register is transferred to the shift register of the subsequent stage. For instance, the message signal in the shift register 600 is transferred to the shift register 321 and that in the shift register 321 to the shift register 322 while the message signal in the shift register 323 at the final stage is erased. The operating time of the timer 651 is selected to ensure the transfer of the signal from the shift register 600 to the shift register 321.

Next will be described the message readout process. When the pager holder depresses the message readout switch 11, a high level signal E (FIG. 6E) is provided from the NAND gate 313 to the counter 371 and to the shift register 324 through the OR gate 676, and NAND and AND gates 312 and 399, respectively. The counter 371 outputs a high level signal G (FIG. 6G) at its $Q_1$ terminal to open AND gates 339 to 341 through which the message signal stored in the register 321 is transferred to OR gates 381 to 383 and then to the shift register 324. The display driver circuit 5 displays the transferred message signal on the message display 6.

The depressing of the switch 11 also inverts the Q output of the flip-flop 303 to provide a signal F, thereby to trigger the timer 361 which has an expiration time $T_2$ (about 8 sec. in this instance). When the time $T_2$ lapses, both the counter 371 and shift register 324 are reset, whereby the message displayed on the display 6 disappears. On the other hand, if the next depressing of the switch 11 is carried out before the time $T_2$ lapses, the counter 371 counts the clock signal to provide a signal H (FIG. 6H) from its $Q_2$ terminal to AND gates 336 to 338. Similarly to the first depressing of the switch 11, the message signal stored in the shift register 322 is displayed on the message display 6.

When the pager holder depresses the switch 11 (n+1) times so that the counter 371 sequentially counts the clock signal, the counter 371 provides a high level signal at its $Q_{n+1}$ terminal, as shown in FIG. 7B. However, the counter 371 is immediately reset by the high level signal applied through an AND gate 392 and OR gate 681, because the $\overline{Q}$ terminal output of the flip-flop 652 is at a high level (See FIGS. 7B to 7D). The trailing point of the reset pulse is detected by an inverter 314, AND gate 393 and D-type flip-flop 362 to produce a pulse at the Q terminal of flip-flop 362, as shown in FIGS. 7E to 7G. The pulse from the flip-flop 362 is provided to the counter 371 via the OR gate 676 as a clock signal so that the counter 371 returns to the beginning, i.e., it provide a high level signal at its $Q_1$ terminal, as shown in FIG. 7I.

In FIG. 5, a counter 370, which is preset by a power switch (not shown), is provided with the output $S_4$ of the flip-flop 650 which occurs every time a received message signal is stored in the shift register 321. This means that the content of the counter 370 indicates the number of stored message signals. A D-type flip-flop 304 latches each output J, K, L of counter 370 (See FIGS. 6J to 6L). As shown in FIGS. 6F and 6M to 6O, the signal F from the flip-flop 303 opens AND gates 342 to 344 to lead the latched signal J to L to a display unit 400 through a buffer 392.

The display unit 400 is composed of resistors 910 to 915, transistors 930 to 932 and light emitting diodes (LED) 920 to 922. When each transistor is supplied with high level voltage at its base electrode, it turns on the corresponding LED. The lighting of the LED informs the pager holder of the number of the stored message signals. Since the signal F is generated by depressing the switch 11 (FIG. 4), the pager holder arbitrarily confirms the stored message signals and their number.

FIG. 8 is a schematic block diagram showing another embodiment of the present invention which employs a microprocessor. A central processing unit (CPU) 1000 is supplied with the data demodulated by the receiver section 2 (FIG. 1) through a DATA line, the clock signal synchronous with the demodulated data through a CLK line, and a switch signal from the switch 11 (FIG. 1) through an SW line. In response to the switch signal, the CPU 1000 displays the received and stored message signals on a liquid crystal display (LCD) 6 while causing the message number display 9 to show the number of stored message signals, as will be described in detail. The microprocessor μPD7502 (marketed by the assignee of the present application, Nippon Electric Co., Ltd.) which is constructed as schematically shown in FIG. 9, may be used for the CPU 1000.

Figure 9:
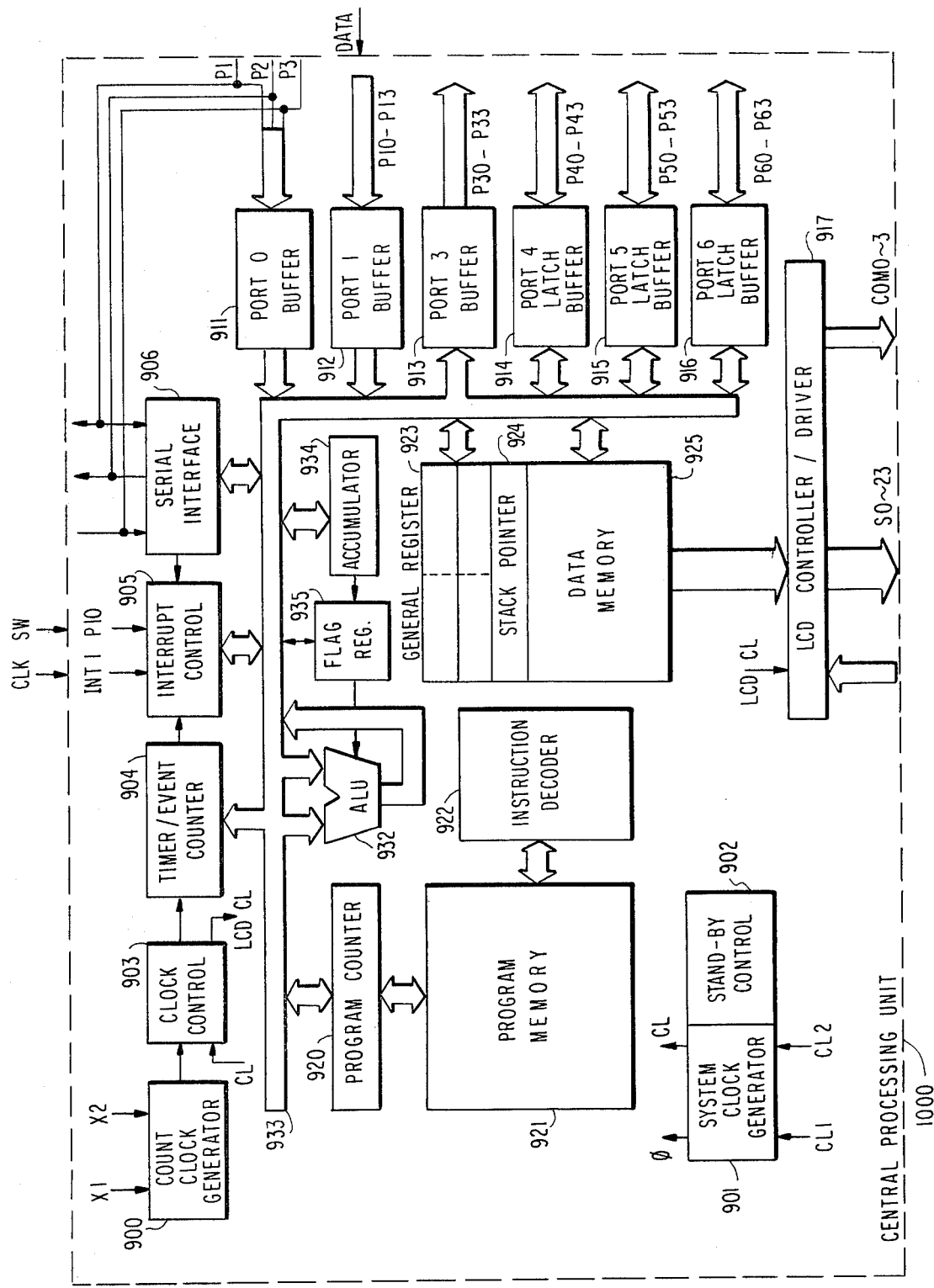
FIG. 9 is a functional block diagram of the central processing unit 1000 shown in FIG. 8.

Referring to FIG. 9, a sequence of operation instructions is stored in a program memory 921 which provides an instruction decoder 922 with the content addressed by a program counter 920. The instruction decoder 922 decodes the addressed content and, in response thereto, transmits control signals to the other components of CPU 1000. The program counter 920 counts "+1" every time the content of the program memory 921 is provided to the decoder 922, while this count is interrupted by a jump instruction, interrupt instruction, or the like. An arithmetic and logic unit (ALU) 932 executes an arithmetic calculation, result of which is stored in an accumulator 934. The accumulator is also used for data transfer with the memory, I/O port, or register. If overflow occurs during the arithmetic calculation, it is indicated by a flag register 935.

A count clock generator 900 is connected to a crystal via terminals X1 and X2 to produce a clock signal. A clock signal is also generated by a system clock generator 901 which is connected to a CR oscillator via terminals CL1 and CL2 and controlled by a stand-by control circuit 902. These clock signals from the generators 900 and 901 are led to a clock control circuit 903 which selects one of them and supplies it to both a timer/event counter 904 and LCD controller/driver 917. The timer/event counter 904 counts the output CP of the clock control circuit 903 by the programmed number. In response to the output of the counter 904 and external signals via terminals INT1 and P10 or in response to signals from a serial interface 906, an interrupt/control circuit 905 forces the CPU to stop the main routine and enables it to execute the interrupt process.

Buffers/latch buffers 911 to 916 are interface circuits between a data bus 933 and external circuits. Under the output LCD CL of the clock control circuit 903, the LCD controller/driver provides common signals COMO-COM3 and segment signals SO-S23 to directly drive the LCD6 and thereby display the message signal stored in a data memory 925. General registers 923 temporarily store data during the arithmetic calculation or data transfer. When the main routine is interrupted by a subroutine or interrupt process, a stack pointer register 924 stores an address to which the main routine returns after the interruption.

Data containing the selective calling signal and message signal is supplied to the CPU 1000 from an input terminal P11 via the buffer 912. The clock signal and switch signal are supplied to the CPU 1000 from input terminals INT1 and P10, respectively, and through the interrupt control circuit 905.

The data memory 925 has storage area, as shown in FIG. 10. A memory buffer 940 temporarily stores the incoming message data which is compared with the message data stored in shift registers 941 to 943. Only when they are identical, the incoming message may be stored in the register 941. A memory counter 944 registers the number of the stored messages. An area 945 is used for counting the bits of the received message to confirm whether or not the message data is completely received. An LCD display memory 950 temporarily stores the message data from shift register 941, 942 or 943 to display it on the LCD. The number of the display is counted and stored in a display counter area 951. A data buffer 930 temporarily stores the received selective calling signal. An ID data area 931 registers calling number data assigned to the pager.

For a detailed description of the CPU shown in FIG. 9, reference is made to the User's Manual of the μPD7502, published by Nippon Electric Co., Ltd., May 23, 1980.

FIG. 11 is a flowchart showing a general procedure of the CPU 1000 for processing received data. At step 95a, a demodulated signal from the receiver section 2 is sampled by the clock signal and examined to determine whether it is identical with the assigned pager number. Upon coincidence, the CPU 1000 advances to step 95b in which the received message signal is temporarily stored in the buffer memory. Then, at step 95c, the CPU 1000 compares the latest message signal with previously stored message signals so as to recondition the message memory and memory counter depending on the result of comparison. After this step 95c, the CPU 1000 returns to the identification process 95a.

The message readout and display process indicated at step 95d starts in response to a switch signal from the switch 11 and proceeds independently of the processes at steps 95a, 95b and 95c. At step 95d, the CPU 1000 sequentially displays stored message signals on the liquid crystal display (LCD)6. The processing at the respective steps 95a–95d will be discussed in detail with reference to FIGS. 12 to 15.

FIG. 12 is a flowchart showing details of the identification process 95a. At step 96a, the interrupt control 905 (FIG. 9) is adapted to detect a rise of the clock signal. Upon a rise of the clock signal, the operation advances to step 96b in which the demodulated input data is temporarily stored in a data buffer 930 through an input buffer 912 (FIG. 9). At step 96c, the data stored in the data buffer 930 is compared with data in a flag register 935 which has stored the pager number of the called pager. If they are not identical, the operation returns to step 96a and circulates again through the successive steps 96a to 96c. If they are identical, the message reception process at step 95b is performed.

FIG. 13 is a flowchart showing details of the message reception process 95b. At step 97a, a message signal reception bit counter 945 (FIG. 10) is initialized, to "0" in this embodiment, in order to manage the number of bits of message signals to be received. At step 97b, a rise of the clock signal is detected by the interrupt control 905 whereupon at step 97c the message data is stored in a memory buffer 940 (FIG. 10). At step 97d, the counter 945 is incremented by "1 (one)" and it is determined at step 97e, whether the counter 945 has been incremented up to a predetermined number of bits. If "NO", the CPU 1000 returns to step 97b and repeats the same procedure; if "YES", the CPU 1000 advances to the message storage process at step 95c (FIG. 11), determining that the reception of a message signal has completed.

In the message storage process shown in FIG. 14, the CPU 1000 at initial steps 98a to 98c compares the latest message signal (stored in the memory buffer 940 at this moment) with message signals previously stored in shift registers $SR_1$ to $SR_n$ (FIG. 10) to determine whether the former is identical with any one of the latter. If "YES", the latest message is not stored and the operation returns from any one of the steps 98a to 98c to the identification process 95a (FIG. 11).

If "NO", that is, if the latest signal is identical with none of the old message signals, the data in the shift registers $SR_1$ to $SR_n$ are renewed with the first stage register $SR_1$ emptied and the data in the final register $SR_n$ erased, at successive steps 98d through 98e. At step 98f, the latest message signal is transferred from the memory buffer 940 to the emptied shift register $SR_1$. At step 98g, a memory counter 944 (FIG. 10) is incremented by "1 (one)" and, at step 98h, LCD6 is energized through output ports P30–P32 (FIG. 9) to display the number of stored messages. Thereupon, the CPU 1000 returns to the identification step 95a to prepare for the reception of the next message signal.

Figure 15:
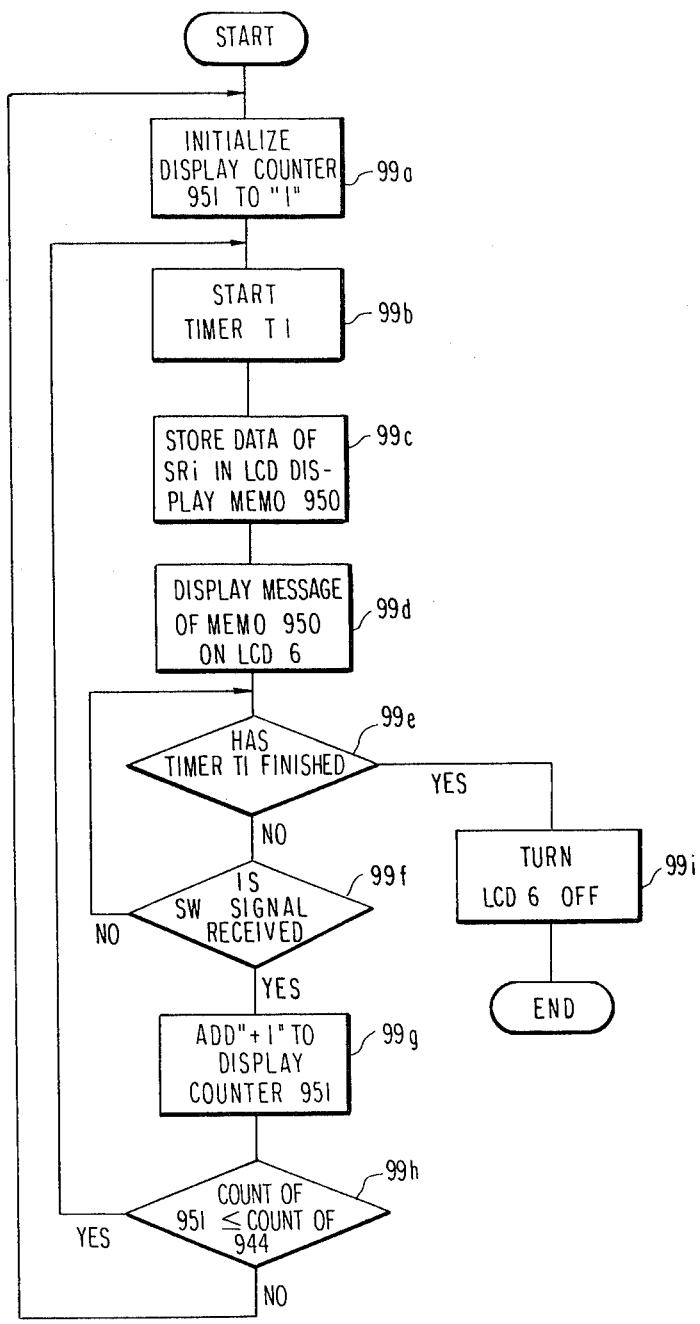

FIG. 15 is a flowchart showing details of the message readout and display process 95d of FIG. 11. This process is triggered by a switch signal from the switch 11 (FIG. 1). Before a display, a display counter 951 (FIG. 10) is initialized to "1" for the purpose of designating a specific one of the message data in the shift registers $SR_1$ to $SR_n$ which is to be displayed. At step 99b, a timer 904 (FIG. 9) is driven to start counting the time period $T_1$. At step 99c, an LCD display memory 950 (FIG. 10) is loaded with data in a message register $SR_i$ which corresponds to the count i (i=1 through n) of the display counter 951. It will be seen that, since the display counter 951 has been initialized to "1" at step 99a, the display proceeds sequentially from the data in the shift register $SR_1$, that is, from the latest message. At step 99d, a display "ON" command is delivered so that an LCD drive signal is fed to an LCD controller/driver 917 (FIG. 9) to display the message in the shift register $SR_i$ on the LCD6.

At step 99e, whether the timer 904 triggered at step 99b has counted the time period $T_1$ is checked. If the time period $T_1$ has not elapsed, step 99f is carried out to check if the switch signal has been received and, if the switch signal is not received, the operation returns to step 99e. Thus, the operation loop 99e to 99f is repeated until the time $T_1$ of the timer 904 expires or a drive through the switch is effected. Upon the lapse of the time $T_1$, a display "OFF" command is delivered to deenergize LCD6 thereby terminating the display process.

When a depression of the switch occurs at step 99f, the display counter 951 is incremented by "1 (one)" at step 99g and is compared with the memory counter 944 at step 99h. If the value in display counter 951 is larger than that in the memory counter 944, the operation returns to the initializing step 99a to repeat the readout and display process. If it is smaller, the operation is started again from the timer triggering step 99b for displaying the next message.

What is claimed is:

1. A radio pager comprising:
   means for receiving and demodulating a carrier wave modulated with a selective calling signal and a message signal to provide demodulated selective calling and message signals;
   means for detecting from said demodulated selective calling signal a selective calling signal assigned to said radio pager to provide a detected signal;
   means responsive to said detected signal for delivering an alert signal;
   first memory means for storing said demodulated message signal;
   second memory means for respectively storing a plurality of message signals from said first memory means;
   first display means for displaying one of said message signals stored in said second memory means; and
   means for comparing the message signal stored in said first memory means with said plurality of message signals stored in said second memory means and transferring said message signal from said first memory means to said second memory means when all of said message signals stored in said second memory means differ from said message signal in said first memory means.

2. A radio pager as claimed in claim 1, further comprising:

second display means responsive to the output of said comparing means for displaying the number of message signals stored in said second memory means;

gate control means responsive to a control signal for sequentially supplying first display means with the stored message signals of said second memory means from the latest one to the oldest one; and switching means for generating said control signal.

3. A radio pager as claimed in claim 2, wherein said gate control means comprises means for detecting the completion of reception of said received message signal to provide a completion signal; means for providing a clock signal in response to either said completion signal or said control signal; a counter circuit for counting said clock signal to produce successive gate signals; and gate circuits responsive to respective ones of said gate signals for selectively supplying both said first display means and said comparing means with the message signals stored in said second memory means.

4. A radio pager as claimed in claim 1, 2, or 3, wherein said first and second memory means comprise shift registers.

5. A radio pager as claimed in claim 3, wherein said comparing means comprises exclusive OR circuits receiving the message signal stored in said first memory means and the message signal from said gate circuits; and a NOR circuit connected to the outputs of said exclusive OR circuits.

6. A radio pager as claimed in claim 2 further comprising timer means for turning off both said first and second display means after a predetermined time period from the beginning of displaying.

7. A radio pager as claimed in claim 2, wherein said second display means comprises a plurality of light-emitting diodes with different diodes or combinations thereof corresponding to a counter circuit for counting said number of stored message signals; means responsive to said control signal for reading the count out of said counter circuit; and driving means respective to the output of said reading means for lighting at least one of said light emitting diodes representative of said number of stored message signals.

8. A radio pager comprising;

first means for receiving a calling signal including a selective calling signal and a message signal;

second means for storing the received selective calling signal;

third means for comparing the signal stored in said second means with a calling signal assigned to said radio pager;

fourth means for storing the received message signal when the signals compared in said third means are identical with each other;

fifth means for storing a plurality of message signals fed from said fourth means;

sixth means for comparing the signal stored in said fourth means with each of the signals stored in said fifth means;

seventh means for transferring the signal stored in said fourth means to said fifth means when the signals compared at said sixth means are different from each other; and eighth means for displaying one of the message signals stored in said fifth means.

9. A radio pager as claimed in claim 8, wherein said second through seventh means are fabricated in a one chip microprocessor.

10. A radio pager as claimed in claim 9 further comprising ninth means for displaying the number of message signals stored in said fifth means; and tenth means for sequentially supplying said eighth means with the message signals of said fifth means from the latest stored message signal to the oldest stored message signal.

11. A radio pager as claimed in claim 1, wherein said second memory means comprises a plurality of memory registers each for storing a different message signal.

12. A radio pager as claimed in claim 1 or 11, wherein said second memory means has a capacity for storing a predetermined number of message signals and, when said message signals in said second memory means include said predetermined number of message signals all of which differ from the message signal in said first memory means, the earliest of said predetermined number of messages is erased upon further transfer of a message from said means for comparing.

* * * * *